United States Patent [19]
Dutro

[11] Patent Number: 5,212,435
[45] Date of Patent: May 18, 1993

[54] VARIABLE SPEED ASYNCHRONOUS INDUCTION MOTOR

[75] Inventor: Lynn R. Dutro, Jonesborough, Tenn.

[73] Assignee: Morrill Motors Inc., Fort Wayne, Ind.

[21] Appl. No.: 887,096

[22] Filed: May 22, 1992

[51] Int. Cl.$^5$ .......................................... H02P 1/44
[52] U.S. Cl. ..................................... 318/785; 318/795
[58] Field of Search ............... 318/775, 777, 779, 782, 318/785, 799, 793, 772, 795

[56] References Cited

U.S. PATENT DOCUMENTS

| | | |
|---|---|---|
| 3,083,326 | 3/1963 | Deming et al. |
| 3,303,402 | 2/1967 | Martin |
| 3,484,670 | 12/1969 | Shankwitz |
| 3,559,016 | 1/1971 | Gerteis |
| 3,803,866 | 4/1974 | Barry .................. 318/785 |
| 4,063,135 | 12/1977 | Wanlass ............... 318/785 |
| 4,100,468 | 6/1978 | Slocum |
| 4,119,894 | 10/1978 | Sorensen |
| 4,371,802 | 2/1983 | Morrill ................. 318/816 |
| 4,649,305 | 3/1987 | Morrill ................. 310/72 |
| 4,672,284 | 6/1987 | Ward |
| 4,734,601 | 3/1988 | Lewus .................. 318/793 |
| 4,823,067 | 4/1989 | Weber .................. 318/775 |
| 4,853,569 | 8/1989 | Lewus .................. 318/795 |
| 5,049,801 | 9/1991 | Potter .................. 318/782 |

FOREIGN PATENT DOCUMENTS

| | | |
|---|---|---|
| 2656134 | 6/1978 | Fed. Rep. of Germany. |
| 2098569 | 8/1974 | France. |
| 957390 | 9/1982 | U.S.S.R. |
| 1280684 | 12/1986 | U.S.S.R. |

Primary Examiner—William M. Shoop, Jr.
Assistant Examiner—John Cabeca
Attorney, Agent, or Firm—George Pappas

[57] ABSTRACT

A single-phase half-pitch capacitor induction motor capable of being varied in rotational speed between a low rotational speed and high rotational speed. The motor includes a main winding connected across a single-phase electrical power source and an auxiliary winding connected in parallel with the main winding. A first phase shifting capacitor is connected in series with the auxiliary winding. A second capacitor is connected in parallel with the first capacitor and a variable resistor is connected in series with the second capacitor. By increasing and decreasing the resistance, overall capacitance in series with the auxiliary winding is increased and decreased and the rotational speed is, thus, also varied. A single pole, single throw switch or a thermistor can be used instead of a variable resistor for different applications.

12 Claims, 1 Drawing Sheet

VARIABLE SPEED ASYNCHRONOUS INDUCTION MOTOR

TECHNICAL FIELD

The present invention relates to the technical field of single-phase asynchronous induction motors. More specifically, the present invention relates to an asynchronous induction motor that can be varied in rotational speed between a low rotational speed and a high rotational speed.

BACKGROUND OF THE INVENTION

One major use for single-phase asynchronous induction motors is for the circulation of cooling air on and around heat exchange surfaces. The various types of asynchronous induction motors used for such purposes, as well as other purposes, include distributed wound and half-pitch capacitor induction motors as described in U.S. Pat. No. 4,371,802. Because these motors are capable of running only at one speed for a given load, the industry currently sizes the motors for worst case conditions. For example, where such a motor is used in a refrigerator as a fan motor for circulating air around the heat exchange surfaces, refrigeration manufacturers size the fan motor for the most extreme combination of heat dissipation conditions. In view of this, the fan motor operates at all times as if a worst case condition exists. Accordingly, power consumption is correspondingly always high and the noise created by the fan motor is also correspondingly high.

In view of the foregoing, there is a need for varying the rotational speed of asynchronous induction motors so that the quantity of circulating cooling air in refrigerators and other appliances can be varied with need and so that power consumption of the motor can be decreased correspondingly with need.

Although various means have previously been introduced for varying the speed of asynchronous induction motors, however, such means have been generally expensive and, on occasion unreliable, especially when the induction motor must operate for a period such as 10 to 20 years.

Accordingly, it is the object of this invention to provide an asynchronous variable speed induction motor for use in appliances, such as refrigerators, clothes dryers, hair dryers, etc. It is further the object of this invention to provide a variable speed induction motor that is generally reliable, generally inexpensive to manufacture, and wherein the power consumption decreases as the speed of the motor decreases.

SUMMARY OF THE INVENTION

It is the principal object of the present invention to overcome the above-discussed disadvantages associated with prior single-phase asynchronous induction motors.

The single-phase asynchronous induction motors of the present invention include a main winding that is connected across a single-phase power source. An auxiliary winding is connected in parallel with the main winding and a first capacitor is connected in series with the auxiliary winding. The capacitor functions to shift the electrical phase across the auxiliary winding. The present invention further includes a second capacitor connected in parallel with the first capacitor and a variable resistor, such as a thermistor, connected in series with the second capacitor. Accordingly, by increasing and decreasing the resistance of the variable resistor, the overall capacitance in series with the auxiliary winding is selectively varied. In this fashion, the overall phase shift is varied and the rotational speed of the rotor is selectively controlled between a low rotational speed and a high rotational speed. It should be noted that the auxiliary winding always remains in line and, during operation provides the necessary flux, along with the main winding, for driving the rotor. In fact, the asynchronous induction motor would stop and not work if the auxiliary winding were not in line at all times. Thus, the present invention only causes the rotational speed of the motor to be increased and decreased.

The asynchronous induction motor of the present invention is highly reliable because, even if the variable resistor were to fail, the motor would continue running. More specifically, depending on whether the resistor fails in an open or closed position, the motor would not stop. Rather, the motor would continue running at either a low speed or a high speed, depending on the failure mode of the resistor and whether or not the second capacitor continues to be in line.

In addition, the asynchronous induction motor of the present invention accomplishes its objectives generally inexpensively because a relatively inexpensive resistive element such as a thermistor and a second capacitor provide the variable speed control. This is because a generally low current device, such as a variable resistor or thermistor, directly controls the relatively high power-consuming asynchronous motor.

Further yet, if discreet speeds were required, the same could be accomplished by switching one or more capacitors in parallel with the auxiliary winding. For example, a two-speed motor may be provided by replacing the above-described variable resistor with a single-pole, single-throw switch.

In one form thereof, the present invention is directed to a single-phase asynchronous induction motor variable in rotational speed between a low rotational speed and a high rotational speed. The motor includes a main winding for connecting across a single-phase electrical power source and an auxiliary winding connected in parallel with the main winding. Impedance elements are connected to the auxiliary winding for shifting the electrical phase across the auxiliary winding. The rotor is continuously driven during operation of the motor by flux created by both the main winding and the auxiliary winding. Elements are provided for varying the impedance between a first impedance and a second impedance whereby the rotational speed of the rotor is selectively controlled during operation of the motor between a low rotational speed and a high rotational speed.

In one form thereof, the present invention is directed to a single-phase asynchronous induction motor including a stator core member having a plurality of substantially equally angularly-spaced, radially inwardly extending teeth respectively defining winding slots therebetween. The teeth have inner ends defining a bore and a rotor member is provided in the bore having a peripheral surface defining air gaps with the ends of the teeth. The rotor has generally axially extending slots formed therein. The teeth inner ends have a circular shape with a diameter greater than the rotor diameter thereby forming the air gaps. A squirrel cage winding is provided in the rotor member slots. A main winding is provided on the stator core member and forms a predetermined even number of magnetic poles. An auxiliary winding is provided on the stator core member mechanically angularly displaced from the main winding and forms the same number of magnetic poles. The auxiliary winding is connected in parallel with the main winding. The stator teeth are equal in number to twice the number of poles. The main winding includes a plurality of coils equal in number to the number of poles and the main winding coils respectively embrace alternate consecutive teeth. The auxiliary winding includes a plurality of coils equal in number to the number of poles and the auxiliary winding coils respectively embrace consecutive alternate teeth respectively intermediate the first named alternate teeth. There is one coil only on each of the teeth. Impedance elements are connected to the auxiliary winding for shifting the electrical phase across the auxiliary winding. The rotor is continuously driven during operation by flux created by both the main and auxiliary windings. Elements are provided for varying the impedance between a first impedance and a second impedance whereby the rotational speed of the rotor is selectively controlled during operation between a low rotational speed and a high rotational speed.

The impedance elements are preferably a first capacitor connected in series with the auxiliary winding and a second capacitor connected in parallel with the first capacitor. In addition, a variable resistor is connected in series with the second capacitor for varying the resistance thereof between a first resistance and a second resistance and for, thereby, varying overall capacitance that is in series with the auxiliary winding. The variable resistor can be a switch for selectively connecting and disconnecting the second capacitor in parallel with the first capacitor, or a temperature responsive thermistor such as a negative temperature coefficient thermistor.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

Figure 1:
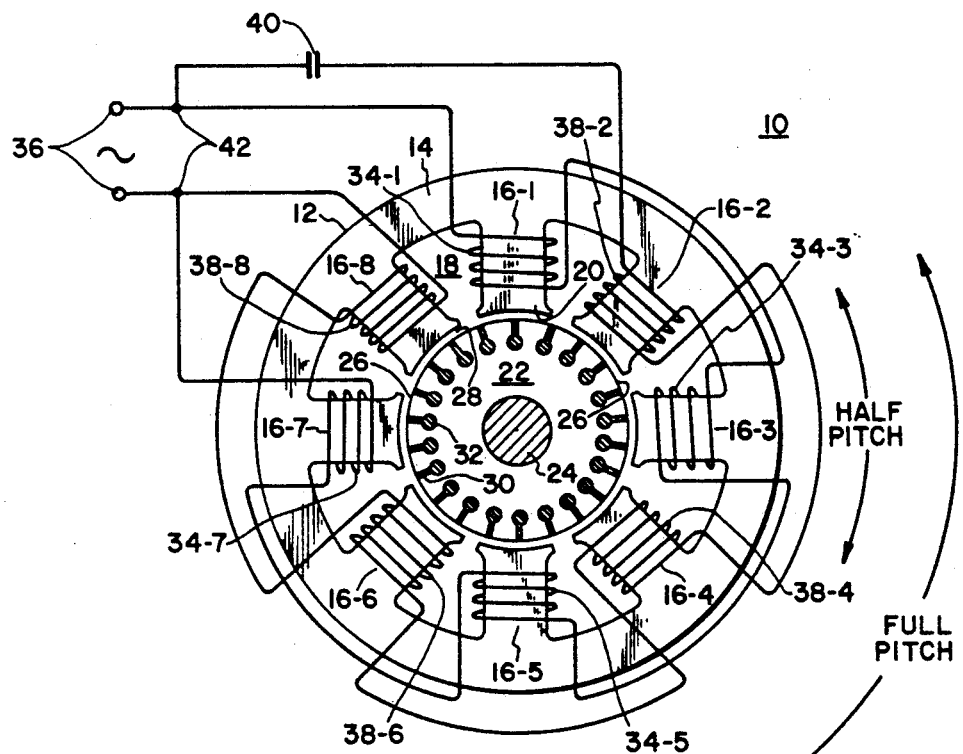
FIG. 1 is a cross-sectional side diagrammatic view of a typical asynchronous half pitch capacitor induction motor.

The exemplifications set out herein illustrate preferred embodiments of the invention, in one form thereof, and such exemplifications are not to be construed as limiting the scope of the disclosure or the scope of the invention in any manner.

DETAILED DESCRIPTION OF THE PREFERRED EMBODIMENT

Referring to the figures of the drawings, there is shown a single-phase asynchronous induction motor generally indicated as 10 and having a laminated stator core member 12. Stator core member 12 includes a generally cylindrically-shaped yoke portion 14 and equally angularly spaced radially inwardly extending teeth 16 respectively defining winding slots 18 therebetween. Teeth 16 have inner ends 20 which define a bore for receiving laminated rotor member 22 on shaft 24. Outer periphery 26 of rotor member 22 defines radial air gaps 28 with inner ends 20 of stator teeth 16. Outer periphery 26 also has generally axially extending slots 30 formed therein for a squirrel cage winding 32 therein in a known and customary fashion. The number of stator teeth 16 is twice the number of poles of motor 10 and, thus, in the embodiment shown in the figures, there are four poles and a total of eight stator teeth 16. The inner ends 20 of teeth 16 have substantially equal angular extent. That is, the pole face of each tooth 16 embraces outer periphery 26 of rotor member 22 with the same span as every other tooth.

Similar to the half-pitch capacitor induction motor disclosed in U.S. Pat. No. 4,371,802 to Wayne J. Morrill, the full text and teachings of which are expressly incorporated herein by reference, a main field winding is provided including serially connected coils 34-1, 34-3, 34-5, and 34-7 respectively embracing teeth 16-1, 16-3, 16-5, and 16-7. There are the same number of coils 34 as the number of poles. The main field winding coils 34-1, 34-3, 34-5, and 34-7 are serially connected across single-phase alternating current source 36 such as 120 volts, 60 Hz.

An auxiliary field winding is provided and includes coils 38-2, 38-4, 38-6 and 38-8 respectively embracing consecutive alternate teeth 16-2, 16-4, 16-6, and 16-8 intermediate the teeth upon which the main winding coils 34 are wound. Auxiliary field winding coils 38-2, 38-4, 38-6, and 38-8 are serially connected with phase shifting first capacitor 40 across the serially connected main field winding coils 34 as indicated at 42. Thus, the auxiliary field winding is connected in parallel with the main field winding.

It will be understood herein that phase shifting capacitor 40 is only one means for phase displacing the main field winding from the auxiliary field winding and, that other equivalent impedance structures are contemplated as part of this means, such as, for example, by varying the number of turns, the size of the wire, and locating capacitors in different parts of the main and auxiliary field windings. Accordingly, it should be understood that various components of the motor structure can be varied for providing the necessary means for phase displacing the main field winding from the auxiliary field winding. As can also be appreciated, two-phase alternating current could be utilized connecting each of the main and auxiliary windings to the two different phases and the same is also contemplated herein as part of the means for phase displacing.

As indicated in FIG. 1, full pitch is the angular extent of one pole of motor 10, i.e., 90 degrees mechanical in the illustrated four pole embodiment, and half-pitch is the angular extent of one-half of one pole i.e., 45 degrees mechanical in the illustrated four pole embodiment. The magnetic flux crossing air gap 28 into or out of respective teeth ends 20 has a substantially half-pitch span.

Figure 2:
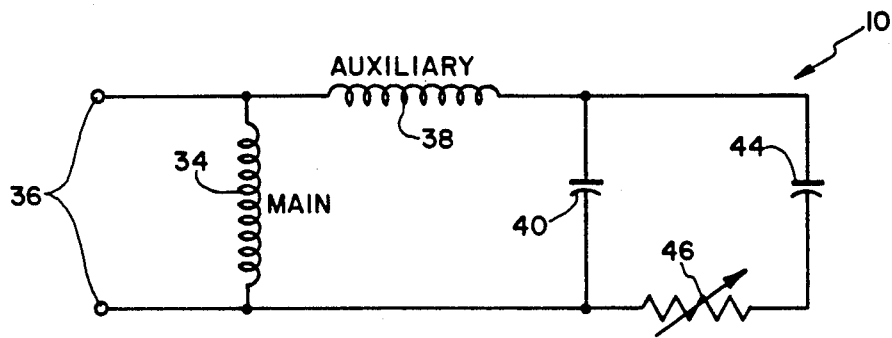
FIG. 2 is a schematic of the single-phase asynchronous variable speed induction motor according to the present invention; and, FIG. 3 is a torque versus speed graph showing the low rotational speed and high rotational speed as a fan torque load increases.

Now referring to FIG. 2, the main winding 34, auxiliary winding 38, and phase shifting first capacitor 40 in series with auxiliary winding 38 are schematically shown. In addition to capacitor 40, as shown, there is provided a second capacitor 44 connected in parallel with the phase shifting first capacitor 40. A variable resistor 46 is connected in series with second capacitor 44 and, thus, is also in parallel with first capacitor 40. As can be appreciated, by increasing the resistance of variable resistor 46, capacitor 44 can be effectively taken out of the circuit so that only first capacitor 40 is effectively in series with auxiliary winding 38. More specifically, by increasing resistance, capacitance is decreased and, in the preferred embodiment, the rotational speed of the motor is decreased. On the other hand, by decreasing the resistance of variable resistor 46, the overall capacitance in series with auxiliary winding 38 is increased and the rotational speed of motor 10 is, thus, increased.

It should be understood that although capacitors 40 and 44 are disclosed herein in the preferred embodiment, it is contemplated that other impedance components can be used instead for providing the necessary phase shift. In addition, the impedance of element 44 can be varied between a first impedance and a second impedance for selectively controlling the rotational speed of the motor.

Further yet, variable resistor 46, in a second embodiment, can be replaced by a single pole, single throw switch for selectively connecting and disconnecting the second capacitor 44 to the circuit and selectively placing the second capacitor 44 in parallel with the first capacitor. In this second embodiment, motor 10 would, in essence, be a two-speed motor.

In a third embodiment, it is contemplated that variable resistor 46 is temperature responsive, increasing and decreasing in resistance in response to increasing and decreasing temperature. More specifically, in this embodiment, variable resistor 46 is a negative temperature coefficient thermistor that decreases in resistance as the temperature increases. Thus, as the temperature increases, second capacitor 44 is placed in the circuit increasing capacitance and, also, increasing the rotational speed of the motor. In this most preferred embodiment, a fan can be connected to the rotor shaft 24 for circulating cooling air and, as the temperature increases, the rotational speed of the motor increases and so does the quantity of moving air. Further yet, as the temperature decreases, the motor rotational speed also decreases thereby decreasing the quantity of moving air and, also, decreasing the amount of noise made and decreasing power consumption. As can be appreciated, such control is ideal for appliances such as refrigerators.

As is evident from the foregoing, the rotational speed of motor 10 is controlled between a low limit and a high limit. Because main winding 34 and auxiliary winding 38 are always in the circuit during operation of the motor, the rotor is continuously driven by flux created by both the main and auxiliary windings. Second capacitor 44 and variable resistor 46 are not capable of causing motor 10 to come to a dead stop. Thus, should variable resistor 46 fail in the open position, motor 10 will continue to run at its lowest rotational speed. On the other hand, if variable resistor 46 fails in the closed or lowest resistance position, motor 10 will continue to run at its highest rotational speed.

Figure 3:
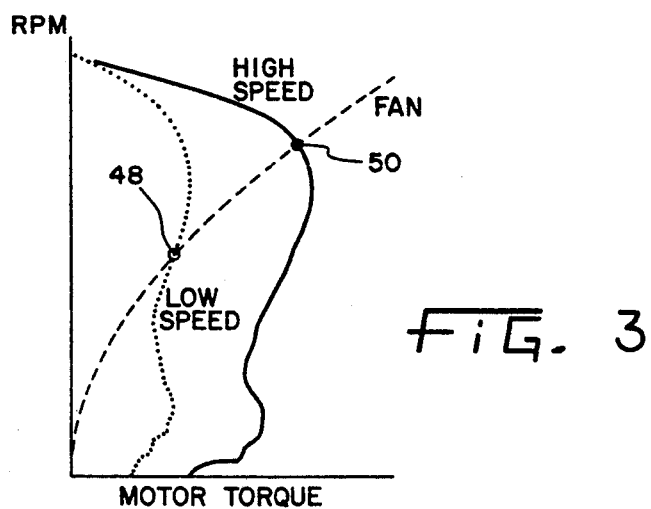

To further show the operation of the present variable speed asynchronous induction motor, a torque versus rotational speed graph is shown in FIG. 3. The solid line indicates the highest rotational speed of the motor when variable resistor 46 is at its lowest level making overall capacitance in series with auxiliary winding 38 maximum. The dashed line, however, indicates the speed of the motor when variable resistor 46 is at its maximum, or infinite in the event that a single pole single throw switch is used, such that overall capacitance in series with auxiliary winding 38 is at its lowest and motor speed is correspondingly also at its lowest. It should be noted that both low and high speed graph lines of FIG. 3 were made with the motor having a fan blade attached thereto and where the fan torque load increases as indicated by the longer dashed lines. Finally, it is noted that where a variable resistor 46 is used, such as a thermistor, the speed of the motor for a given fan torque load will vary between a low point 48 whereat the low speed and fan torque lines meet and a high point 50 whereat the high speed and fan torque lines meet.

As is now evident, the above-described variable speed asynchronous induction motor is advantageous in that even if variable resistor 46 or any other element used in its place fails, motor 10 will continue to run. In addition, resistor 46 or any element used instead is not subjected to the full current traveling through the auxiliary winding and, therefore, can be a low current device. Accordingly, a relatively high power consuming motor 10 is controlled with a component level device 46.

While the invention has been described as having specific embodiments, it will be understood that it is capable of further modifications. This application is, therefore, intended to cover any variations, uses, or adaptations of the invention following the general principles thereof and including such departures from the present disclosure as come within the known or customary practice in the art to which this invention pertains and fall within the limits of the appended claims.

What is claimed is:

1. A single-phase asynchronous induction motor variable in rotational speed between a low rotational speed and a high rotational speed in response to a condition outside of the motor, said motor comprising:
   a main winding for connecting across a single-phase electrical power source;
   an auxiliary winding connected in parallel with said main winding;
   impedance means connected to said auxiliary winding for shifting the electrical phase across said auxiliary winding;
   a rotor continuously driven during operation by flux created by both said main and auxiliary windings; and,
   means for varying said impedance means between a first impedance and a second impedance in response to a condition outside of the motor and selectively varying the rotational speed of said rotor during operation of said motor between a low rotational speed and a high rotational speed.

2. The single-phase asynchronous induction motor of claim 1 wherein said impedance means includes a first capacitor connected in series with said auxiliary winding, a second capacitor connected in parallel with said first capacitor, and variable resistance means connected in series with said second capacitor for varying the resistance thereof between a first resistance and a second resistance and for thereby varying overall capacitance in series with said auxiliary winding.

3. The single-phase asynchronous induction motor of claim 2 wherein said resistance means is a variable resistor.

4. The single-phase asynchronous induction motor of claim 2 wherein said resistance means is a switch selectively connecting and disconnecting said second capacitor in parallel with said first capacitor.

5. The single-phase asynchronous induction motor of claim 2 wherein said resistance means is temperature responsive, increasing and decreasing in resistance in response to increasing and decreasing temperature.

6. The single-phase asynchronous induction motor of claim 5 wherein said resistance means is a negative temperature coefficient thermistor.

7. In a single-phase asynchronous induction motor including a stator core member having a plurality of substantially equally angularly-spaced, radially inwardly extending teeth respectively defining winding slots therebetween, said teeth having inner ends defining a bore, a rotor member in said bore having a peripheral surface defining air gaps with said ends of said teeth and having generally axially extending slots formed therein, said teeth inner ends having a circular shape with a diameter greater than the rotor diameter thereby forming said air gaps, a squirrel cage winding in said rotor member slots, a main winding on said stator core member, said main winding forming a predetermined even number of magnetic poles, an auxiliary winding on said stator core member mechanically angularly displaced from said main winding and forming the same number of magnetic poles, said auxiliary winding connected in parallel with said main winding, said teeth being equal in number to twice the number of said poles, said main winding comprising a plurality of coils equal in number to the number of said poles, said main winding coils respectively embracing alternate consecutive ones of said teeth, said auxiliary winding comprising a plurality of coils equal in number to the number of said poles, said auxiliary winding coils respectively embracing consecutive alternate teeth respectively intermediate said first named alternate teeth, there being one coil only on each said tooth, the improvement comprising:

impedance means connected to said auxiliary winding for shifting the electrical phase across said auxiliary winding;

said rotor continuously being driven during operation by flux created by both said main and auxiliary windings; and, means for varying said impedance means between a first impedance and a second impedance in response to a condition outside of the rotor during operation between a low rotational speed and a high rotational speed.

8. The single-phase asynchronous induction motor of claim 7 wherein said impedance means includes a first capacitor connected in series with said auxiliary winding, a second capacitor connected in parallel with said first capacitor, and variable resistance means connected in series with said second capacitor for varying the resistance thereof between a first resistance and a second resistance and for thereby varying overall capacitance in series with said auxiliary winding.

9. The single-phase asynchronous induction motor of claim 8 wherein said resistance means is a variable resistor.

10. The single-phase asynchronous induction motor of claim 8 wherein said resistance means is a switch selectively connecting and disconnecting said second capacitor in parallel with said first capacitor.

11. The single-phase asynchronous induction motor of claim 8 wherein said resistance means is temperature responsive, increasing and decreasing in resistance in response to increasing and decreasing temperature.

12. The single-phase asynchronous induction motor of claim 11 wherein said resistance means is a negative temperature coefficient thermistor.

* * * * *

UNITED STATES PATENT AND TRADEMARK OFFICE
CERTIFICATE OF CORRECTION

PATENT NO. : 5,212,435

DATED : May 18, 1993

INVENTOR(S) : Lynn R. Dutro

It is certified that error appears in the above-identified patent and that said Letters Patent is hereby corrected as shown below:

Claim 7, column 8, line 9, after "the" insert the following: --motor and selectively varying the rotational speed of said--.

Signed and Sealed this

Fourth Day of January, 1994

Attest:

BRUCE LEHMAN

Attesting Officer

Commissioner of Patents and Trademarks